US008589119B2

(12) United States Patent
Comi (10) Patent No.: US 8,589,119 B2
(45) Date of Patent: Nov. 19, 2013

(54) SYSTEM AND METHOD FOR DISTRIBUTED PROCESSING

(75) Inventor: Gabriel D. Comi, State College, PA (US)

(73) Assignee: Raytheon Company, Waltham, MA (US)

( * ) Notice: Subject to any disclaimer, the term of this patent is extended or adjusted under 35 U.S.C. 154(b) by 349 days.

(21) Appl. No.: 13/017,846

(22) Filed: Jan. 31, 2011

(65) Prior Publication Data

US 2012/0197596 A1     Aug. 2, 2012

(51) Int. Cl.
 *G06F 15/00* (2006.01)
(52) U.S. Cl.
 USPC .......................................................... 702/188
(58) Field of Classification Search
 USPC .......................................................... 702/188
 See application file for complete search history.

(56) References Cited

U.S. PATENT DOCUMENTS

2003/0002864 A1 *  1/2003  Mollie et al. .................. 386/125

OTHER PUBLICATIONS

Saab, Paul, "Scaling memcached at Facebook", Facebook, http://www.facebook.com/note.php?note_id=39391378919. 5 pages, Dec. 12, 2008.
Yahoo! Developer Network, Hadoop Tutorial—YDN, "*Module 1: Tutorial Introduction*", developer.yahoo.com/.../module1.html, 58 pages, Sep. 23, 2010.
Yahoo! Developer Network, Hadoop Tutorial—YDN, "*Module 2: The Hadoop Distributed File System*", developer.yahoo.com/.../module2.html, 15 pages, Sep. 23, 2010.
Yahoo! Developer Network, Hadoop Tutorial—YDN, "*Module 3: Getting Started With Hadoop*", developer.yahoo.com/.../module3.html, 11 pages, Sep. 23, 2010.
Yahoo! Developer Network, Hadoop Tutorial—YDN, "*Module 4: MapReduce*", developer.yahoo.com/.../module4.html, 14 pages, Sep. 23, 2010.
Yahoo! Developer Network, Hadoop Tutorial—YDN, "*Module 5: Advanced MapReduce Features*", developer.yahoo.com/.../module5.html, 13 pages, Sep. 23, 2010.
Wiley, Richard G., "*Electronic Intelligence: The Analysis of Radar Signals*", Second Edition, Artech House, Inc., Cover, Table of Contents and Chapter 10, Section 10.1-Section 10.3.2 and Section 12, Section 12.1-12.2, 10 pages, 1993.
Ciurana, Eugene, Java Development News: "*Why Should You Care About MapReduce?*", The ServerSide.com, http://www.theserverside.com/news/1321219/Why-Should-You-Care-About-MapReduce, 10 pages, Feb. 1, 2008.

* cited by examiner

*Primary Examiner* — Tung S Lau
(74) *Attorney, Agent, or Firm* — Cantor Colburn LLP (57) ABSTRACT

In one embodiment, a first portion and a second portion of a data set are identified. The first portion of the data set is sent to a first node that stores it in a first primary storage. The first primary storage is configured such that a first processor of the first node accesses information stored in the first primary storage without accessing another storage device. The second portion of the data set is sent to a second node that stores it in a second primary storage. The second primary storage is configured such that a second processor of the second node accesses information stored in the second primary storage without accessing another storage device. The first node generates a first set of results by processing the first portion of the data set. The second node generates a second set of results by processing the second portion of the data set.

25 Claims, 3 Drawing Sheets

SYSTEM AND METHOD FOR DISTRIBUTED PROCESSING

TECHNICAL FIELD

This disclosure relates generally to processing data and more particularly to a system and method for distributed processing.

BACKGROUND

The need for computing data has grown. Larger sets of data now need to be processed at faster rates. Distributed processing systems have been developed to address the need to compute large data sets. However, existing processing systems suffer with latency issues that prevent their use in certain environments, such as certain signal processing scenarios.

SUMMARY

According to certain embodiments of the present disclosure, disadvantages and problems associated with previous techniques for distributed processing may be reduced or eliminated.

According to one embodiment of the present disclosure, a method includes receiving a data set and identifying a first portion of the data set and a second portion of the data set. The first portion of the data set is different from the second portion of the data set. The method includes generating a first identifier for the first portion of the data set and generating a second identifier for the second portion of the data set. The method includes sending the first portion of the data set and the first identifier to a first node. The first node includes a first primary storage. The first node stores the first portion of the data set in the first primary storage. The first primary storage is configured in the first node such that a first processor of the first node accesses information stored in the first primary storage without accessing another storage device. The method includes sending the second portion of the data set and the second identifier to a second node that includes a second primary storage. The second node stores the second portion of the data set in the second primary storage. The second primary storage is different than the first primary storage and the second primary storage is configured in the second node such that a second processor of the second node accesses information stored in the second primary storage without accessing another storage device. The method includes configuring a first module to retrieve the first portion of the data set using the first identifier. The first module is configured to provide the first portion of the data set to a first process operating on the first node. The first process is configured to generate a first set of results by processing the first portion of the data set. The method includes configuring a second module to retrieve the second portion of the data set using the second identifier. The second module is configured to provide the second portion of the data set to a second process operating on the second node. The second process is configured to generate a second set of results by processing the second portion of the data set.

In certain embodiments of the present disclosure, sending the first portion of the data set and the first identifier to the first node may comprise sending the first portion of the data set and the first identifier to a distributed cache. The method may further include sending the first module to the first node and sending the second module to the second node. The method may further include receiving the first set of results and receiving the second set of results. The method may further include producing output data by correlating the first set of results with the second set of results and storing the output data. Generating the first set of results may include generating a first set of intermediate results from the first portion of the data set by performing clustering on the first portion of the data set and scoring the first set of intermediate results. Generating the second set of results may include generating a second set of intermediate results from the second portion of the data set by performing clustering on the second portion of the data set and scoring the second set of intermediate results. The data set may include data generated by an array of sensors.

According to one embodiment of the present disclosure, a system includes a first node that comprises at least one processor. The at least one processor is configured to receive a data set and identify a first portion and a second portion of the data set. The first portion of the data set is different from the second portion of the data set. The at least one processor is configured to generate a first identifier for the first portion of the data set and generate a second identifier for the second portion of the data set. The at least one processor is configured to send the first portion of the data set and the first identifier to a second node, the second node comprising a first primary storage and storing the first portion of the data set in the first primary storage. The first primary storage is configured in the second node such that a first processor of the second node accesses information stored in the first primary storage without accessing another storage device. The at least one processor is configured to send the second portion of the data set and the second identifier to a third node, the third node comprising a second primary storage and storing the second portion of the data set in the second primary storage. The second primary storage is different than the first primary storage and the second primary storage is configured in the third node such that a second processor of the third node accesses information stored in the second primary storage without accessing another storage device. The at least one processor is configured to configure a first module to retrieve the first portion of the data set using the first identifier. The first module is configured to provide the first portion of the data set to a first process operating on the second node. The first process is configured to generate a first set of results by processing the first portion of the data set. The at least one processor is configured to configure a second module to retrieve the second portion of the data set using the second identifier. The second module is configured to provide the second portion of the data set to a second process operating on the third node. The second process is configured to generate a second set of results by processing the second portion of the data set.

Certain embodiments of the present disclosure may provide one or more technical advantages. In certain embodiments, data may be processed in a distributed processing system with fewer latency delays. Real-time processing may be performed using distributed processing techniques.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION

Figure 1:
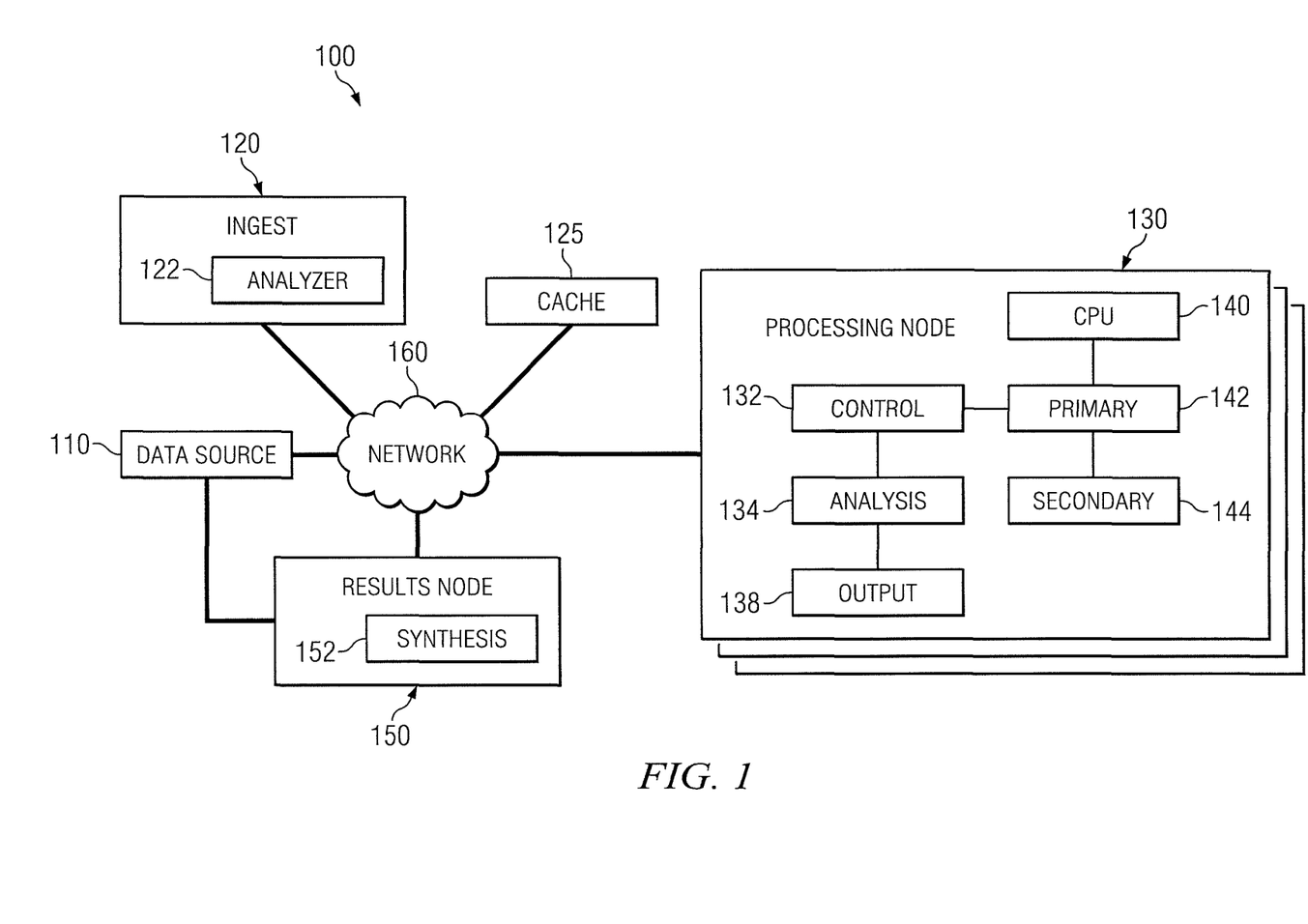
FIG. 1 is a block diagram illustrating one embodiment of a parallel processing system.

FIG. 1 is a block diagram illustrating one embodiment of parallel processing system 100. Data source 110, ingest module 120, cache module 125, processing nodes 130, and results node 150 are all communicatively coupled using network 160. Each of processing nodes 130 includes primary storage 142. In some embodiments, data source 110 may make available a stream of data that is processed by ingest module 120. Ingest module 120 may divide the data into portions and cause the portions of data to be stored at the primary storage 142 of each of the processing nodes 130 using cache module 125. Each of processing nodes 130 may process the portion of data stored in its respective primary storage 142 and provide the results of the processing to results node 150. As a result, in some embodiments, system 100 may provide the capability of processing large streams of data using distributed computing techniques without certain latency delays as further described below.

In some embodiments, data source 110 provides data for system 100 to process. The data may be static or dynamic. For example, data source 110 may provide a data stream to ingest module 120. As another example, data source 110 may store the data in a location accessible to ingest module 120. Data source 110 may include one or more subsystems that operate to collect and provide one or more data streams to system 100. Some or all of the subsystems may be remotely located from each other and system 100. Using one or more subsystems, data source 110 may be able to provide different types of data, such as satellite data, GPS data, audio data, video data, image data, and other forms of data provided by sensors. Data from sensors may be provided in a static fashion or as a stream. Data may also be provided from sources other than sensors. For example, data may be provided from databases, remote storage, logs, network devices, network events, Web pages, financial transactions, and other data sources.

In some embodiments, ingest module 120 may be implemented using any suitable combination of one or more items of hardware, firmware, and software. Ingest module 120 may include analyzer 122. In some embodiments, analyzer 122 may be software residing on at least one computer readable medium. Some or all of the functions discussed below with respect to ingest module 120 may be performed using analyzer 122. Ingest module 120 may be implemented on the same hardware as: data source 110, one of the processing nodes 130, or results node 150. In some embodiments, ingest module 120 may be coupled to data source 110 or processing nodes 130 without using network 160. Such connections may be implemented using wired or wireless mediums. Analyzer 122 may be configured to receive data in a stream from data source 110 and/or be configured to retrieve data stored at data source 110. Analyzer 122 may be configured to divide data from data source 110 into portions that will be provided to processing nodes 130. Analyzer 122 may be configured to determine identifiers for the formed portions of data and provide the identifiers with the portions of data to processing nodes 130.

In some embodiments, cache module 125 may be implemented using any suitable combination of one or more items of hardware, firmware, and software. Cache module 125 may be implemented on the same hardware as ingest module 120 or one of the processing nodes 130. Cache module 125 may be configured to cause data from ingest module 120 to be stored in each primary storage 142 of processing nodes 130. For example, cache module 125 may be configured to implement the MEMCACHED memory caching system (described at http://memcached.org) and use the primary storage 142 of each of the processing nodes 130 for storing data. Other suitable systems or protocols for storing data in the primary storage 142 of each of the processing nodes 130 may be used by cache module 125.

In some embodiments, processing nodes 130 may be implemented using any suitable combination of one or more items of hardware, firmware, and software. Each of processing nodes 130 may include control module 132, analysis module 134, output module 138, central processing unit (CPU) 140, primary storage 142, and secondary storage 144. Modules 132, 134, 136, and 138 may each be implemented using any suitable combination of one or more items of hardware, firmware, and software. Primary storage 142 may include one or more memory elements, such as random-access memory (RAM). Primary storage 142 may be directly accessed by CPU 140. For example, CPU 140 may be able to read data directly from or write data directly to primary storage 142 without accessing another storage device, such as other memory modules (not including, however, buffers, caches, or other data-storing structures that are part of CPU 140). Secondary storage 144 may include one or more memory elements, such as hard disk drives, optical drives, or flash-memory drives and may include data such as configuration files and operating system files. CPU 140 may not be configured to directly access secondary storage 144. For example, in order for CPU 140 to read data stored in secondary storage 144, the data may first be transferred from secondary storage 144 to primary storage 142 and then accessed by CPU 140 from primary storage 142. Similarly, as an example, in order for CPU 140 to write data to secondary storage 144, the data may first be written to primary storage 142 and then transferred to secondary storage 144 from primary storage 142.

In some embodiments, processing nodes 130 may be configured to implement a distributed cache. Each node of processing nodes 130 may include control module 132. Control module 132 may manage data received from ingest module 120 or cache module 125. For example, control module 132 may cause data from cache module 125 to be stored at primary storage 142. In some embodiments, each control module 132 on processing nodes 130 may be configured by ingest module 120 and/or be created and sent to processing nodes 130 by ingest module 120. Ingest module 120 may provide information to control module 132 regarding which portions of data have been assigned to each of processing nodes 130. Control module 132 may provide data to analysis module 134 or may provide information to analysis module 134 so that analysis module 134 may retrieve data from primary storage 142. For example, control module 132 may provide memory address information regarding the location may be provided to analysis module 134 so that analysis module 134 may retrieve data from primary storage 142.

In some embodiments, analysis module 134 may be configured to process and/or analyze data stored at primary storage 142 using one or more suitable algorithms. For example, analysis module 134 may implement the MAPREDUCE framework (described at http://labs.google.com/papers/mapreduce.html) to process data stored at primary storage 142. Analysis module 142 may create multiple software processes or threads when analyzing or processing the data. For example, if analysis module 134 implements the MAPREDUCE framework, analysis module 134 may create one or more mapping processes one or more reducing processes. The number of processes created by analysis module 134 may depend on the number or type of processors included in CPU 140. In some embodiments, processing nodes 130 may implement a distributed processing system, such as the HADOOP system (described at hadoop.apache.org), that uses a distributed cache for storing the data that will be processed.

In some embodiments, output module 138 may be configured to send the results of the processing performed by analysis module 134 to results node 150. Output module 138 may retrieve these results from either primary storage 142 or secondary storage 144. Control module 132 may inform output module 138 as to where and when to retrieve the results generated by analysis module 134. Output module 138 may include one or more wired or wireless interfaces that are used to communicate with network 160 or to communicate directly with results node 150. For example, output module 138 may include a wired or wireless network connection to communicate with network 160. As another example, output module 138 may include a Universal Serial Bus interface to communicate with results node 150 without using network 160.

In some embodiments, results node 150 may be implemented using any suitable combination of one or more items of hardware, firmware, and software. Results node 150 may be configured to store the results of data processed by processing nodes 130. Results node 150 may provide these results to other systems or to human operators. Results node 150 may receive these results from the output module 138 at each of processing nodes 130 or results node 150 may retrieve these results from cache 125. Results node 150 may include synthesis module 152. Synthesis module 152 may be implemented using any suitable combination of one or more items of hardware, firmware, and software. Synthesis module 152 may process the results received from processing nodes 130. For example, synthesis module 152 may collect the results generated by processing nodes 130 and place them into one or more files. As another example, synthesis module 152 may implement the final reducing steps of the MAPREDUCE framework. In some embodiments, results node 150 may make the output of synthesis module 152 available to other systems or human operators instead of, or in addition to, the results generated by processing nodes 130.

In some embodiments, network 160 may be a communicative platform operable to exchange data or information. In various embodiments, network 160 may include a packet data network offering communication interfaces or exchanges between any two nodes in system 100. Network 160 may be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. Network 160 may include firewalls or other equipment or software that create security zones and/or secure networks such as DMZs. One or more of the components of system 100 described above may be located in one more of such security zones and/or secure networks in some embodiments. For example, data source 110 may be in a DMZ or sandbox that is separate from processing nodes 130.

In some embodiments, system 100 may operate to parallelize the processing of data while reducing latency penalties. For example, data source 110 may provide a stream of radar signals. Data source 110 may include one or more antennas that receive radio frequency energy. Data source 110 may also include one or more subsystems that digitally sample the received radio frequency energy and detect radar pulses. Data source 110 may use the same or a different subsystem to provide or make available a time ordered radar pulse list to ingest module 120.

In this example, ingest module 120 divides the data into portions based on one or more factors, such as the number of processing nodes 130 and/or the size of the data from data source 110. Ingest module 120 assigns an identifier to each portion of data it generates, forming a key-value pair where the key is the identifier determined by ingest module 120 and the value is the portion of data determined by ingest module 120. In this example, the portions of data may consist of radar pulses from various sensors. Ingest module 120 may provide the key-value pairs to cache module 125. All of these steps may be performed using analyzer 122.

In this example, cache module 125 and processing nodes 130 provide a distributed cache system, such as MEMCACHED. Cache module 125 may receive the key-value pairs from ingest module 120 and distribute them amongst processing nodes 130. Control module 132 at each of the processing nodes 130 may receive the key-value pairs and store them in primary storage 142. At each of the processing nodes 130, control module 132 may instruct analysis module 134 to process the key-value pair(s) stored in primary storage 142.

In this example, the analysis module 134 at each of the processing nodes 130 implements a MAPREDUCE framework. Analysis module 134 causes map and reduce software processes or threads (in accordance with the MAPREDUCE framework) to execute on the key-value pair(s) which are retrieved from primary storage 142. In this manner, each of the processing nodes 130 apply statistical clustering to the radar pulse data in the key-value pairs which may deinterleave the radar pulses. The statistical clustering may be based on characteristics of each of the detected radar pulses, such as intensity and frequency characteristics. Map processes may perform clustering while reduce processes may score the clustering. The scored clusters from the reduce processes may be reclustered by the map processes in an iterative and/or recursive manner. Such iterations and/or recursions may be completed once a specified tolerance or threshold has been met or after a specific number of iterations have been performed. After analysis module 134 is complete, the results of the processing are stored in primary storage 142.

In this example, after processing nodes 130 have completed processing the data, results node 150 may receive the results generated by processing nodes 130 using network 160. In some situations, results node 150 may receive the results generated by processing nodes 130 without using network 160 but by using direct connections, such as Universal Serial Bus connections. Synthesis module 152, in this example, then performs a reduce process or multiple reduce processes on the received results. The clustered and scored radar signals may be sorted and combined by synthesis module 152. This may be done by grouping signals that have similar properties, such as statistical properties, frequency properties, amplitude properties, energy properties, or other suitable characteristics.

As indicated by the foregoing examples and embodiments, system 100 may provide multiple advantages. One example of an advantage present in system 100 is reduced latency when performing parallel processing. In some embodiments, this advantage may be present because processing nodes 130 store the portions of data to be processed in primary storage 142 and not secondary storage 144. Another example of an advantage present in some embodiments of system 100 is the capability of performing real time, distributed processing of data, such as sensor data or data streams.

Figure 2:
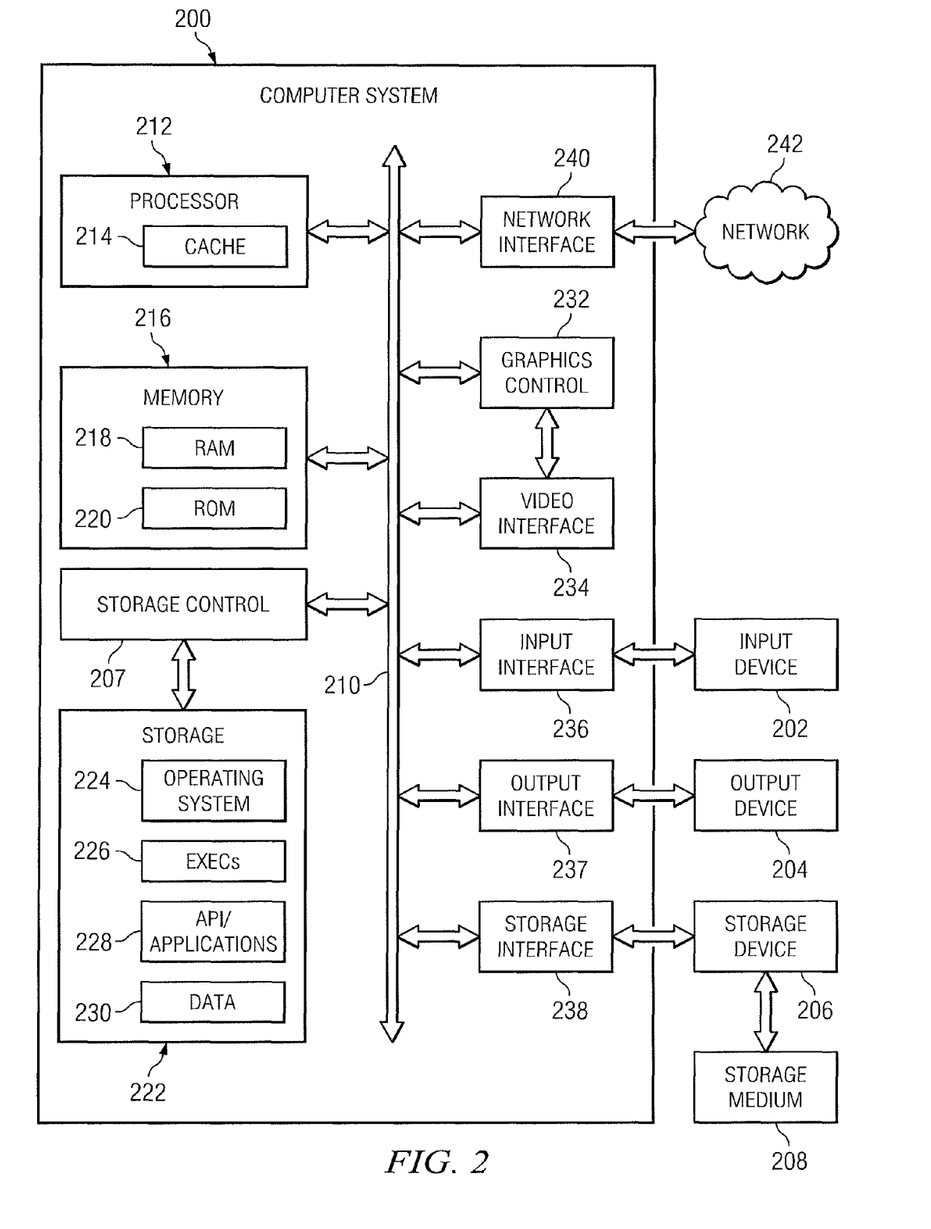
FIG. 2 illustrates an example computer system suitable for implementing one or more portions of particular embodiments.

FIG. 2 illustrates an example computer system 200 suitable for implementing one or more portions of particular embodiments. Although the present disclosure describes and illustrates a particular computer system 200 having particular components in a particular configuration, the present disclosure contemplates any suitable computer system having any suitable components in any suitable configuration. Moreover, computer system 200 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Blocks 110, 120, 125, 130, 132, 134, 138, 140, 142, 144, 150, and 152 of FIG. 1 as well as the elements discussed in FIG. 3 may be implemented using all of the components, or any appropriate combination of the components, of computer system 200 described below.

Computer system 200 may have one or more input devices 202 (which may include a keypad, keyboard, mouse, stylus, or other input devices), one or more output devices 204 (which may include one or more displays, one or more speakers, one or more printers, or other output devices), one or more storage devices 206, and one or more storage medium 208. An input device 202 may be external or internal to computer system 200. An output device 204 may be external or internal to computer system 200. A storage device 206 may be external or internal to computer system 200. A storage medium 208 may be external or internal to computer system 200.

System bus 210 couples subsystems of computer system 200 to each other. Herein, reference to a bus encompasses one or more digital signal lines serving a common function. The present disclosure contemplates any suitable system bus 210 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 200 includes one or more processors 212 (or central processing units (CPUs)). A processor 212 may contain a cache 214 for temporary local storage of instructions, data, or computer addresses. Processors 212 are coupled to one or more storage devices, including memory 216. Memory 216 may include random access memory (RAM) 218 and read-only memory (ROM) 220. Data and instructions may transfer bidirectionally between processors 212 and RAM 218. Data and instructions may transfer unidirectionally to processors 212 from ROM 220. RAM 218 and ROM 220 may include any suitable computer-readable storage media. In some embodiments, the configuration of data and/or instructions in memory 216 describes how analyzer 122, cache module 125, control module 132, analysis module 134, output module 138, and synthesis module 152 may each be implemented.

Computer system 200 includes fixed storage 222 coupled bi-directionally to processors 212. Fixed storage 222 may be coupled to processors 212 via storage control unit 207. Fixed storage 222 may provide additional data storage capacity and may include any suitable computer-readable storage media. Fixed storage 222 may store an operating system (OS) 224, one or more executables (EXECs) 226, one or more applications or programs 228, data 230 and the like. Fixed storage 222 is typically a secondary storage medium (such as a hard disk) that is slower than primary storage. In appropriate cases, the information stored by fixed storage 222 may be incorporated as virtual memory into memory 216. In some embodiments, fixed storage 222 may include network resources, such as one or more storage area networks (SAN) or network-attached storage (NAS). In some embodiments, the configuration of fixed storage 222, EXECs 226, applications or programs 228, and data 230 described above provides examples of how analyzer 122, cache module 125, control module 132, analysis module 134, output module 138, and synthesis module 152 may each be implemented.

Processors 212 may be coupled to a variety of interfaces, such as, for example, graphics control 232, video interface 234, input interface 236, output interface 237, and storage interface 238, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 240 may couple processors 212 to another computer system or to network 242. Network interface 240 may include wired, wireless, or any combination of wired and wireless components. Such components may include wired network cards, wireless network cards, radios, antennas, cables, or any other appropriate components. With network interface 240, processors 212 may receive or send information from or to network 242 in the course of performing steps of particular embodiments. Particular embodiments may execute solely on processors 212. Particular embodiments may execute on processors 212 and on one or more remote processors operating together.

In a network environment, where computer system 200 is connected to network 242, computer system 200 may communicate with other devices connected to network 242. Computer system 200 may communicate with network 242 via network interface 240. For example, computer system 200 may receive information (such as a request or a response from another device) from network 242 in the form of one or more incoming packets at network interface 240 and memory 216 may store the incoming packets for subsequent processing. Computer system 200 may send information (such as a request or a response to another device) to network 242 in the form of one or more outgoing packets from network interface 240, which memory 216 may store prior to being sent. Processors 212 may access an incoming or outgoing packet in memory 216 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 216 may include one or more tangible, computer-readable storage media embodying software and computer system 200 may provide particular functionality described or illustrated herein as a result of processors 212 executing the software. Memory 216 may store and processors 212 may execute the software. Memory 216 may read the software from the computer-readable storage media in mass storage device 216 embodying the software or from one or more other sources via network interface 240. When executing the software, processors 212 may perform one or more steps of one or more processes described or illustrated herein, which may include defining one or more data structures for storage in memory 216 and modifying one or more of the data structures as directed by one or more portions the software, according to particular needs.

In some embodiments, the described processing and memory elements (such as processors 212 and memory 216) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 200 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 3:
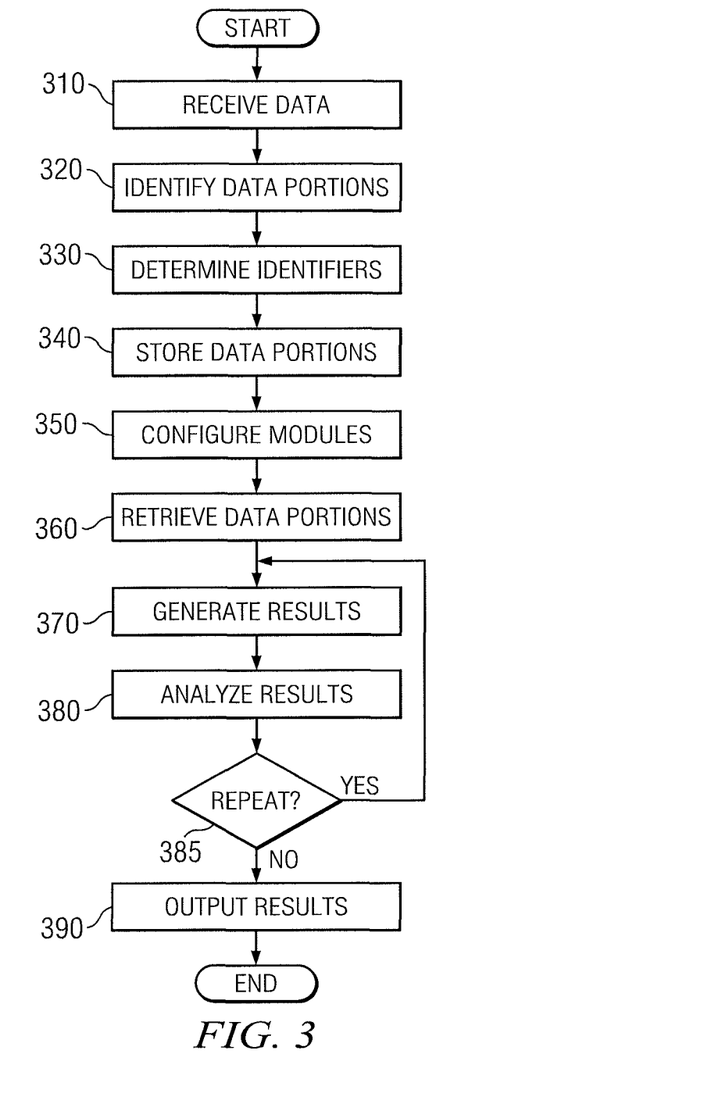
FIG. 3 is a flowchart illustrating an embodiment of the operation of a parallel processing system.

FIG. 3 is a flowchart illustrating an embodiment of the operation of a parallel processing system, such as system 100 of FIG. 1. In general, the steps illustrated in FIG. 3 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1-2.

At step 310, in some embodiments, data may be received at a distributed processing system (such as system 100 of FIG. 1) from a data source. The data may be sensor data. The data may be electronically retrieved from a location local to or remote from the distributed processing system. The system may receive the data as a stream. The data may represent real-time data and/or real-time signals. The system may include an ingest module that receives the data at this step, such as ingest module 120 (including analyzer 122) of FIG. 1. The data may be received from a data source such as data source 110 of FIG. 1.

At step 320, in some embodiments, portions of data from the data received at step 310 may be formed. This step may be performed by a module like ingest module 120 and/or software like analyzer 122 of FIG. 1. The data may be split into portions based on one or more factors. These factors may include the number of processing nodes in the distributed processing system, the size of the data received at step 310, the size of a stream of data expected or already received, the amount of memory available in the distributed processing system, the type or format of data received at step 310, or other suitable factors. For example, at this step the data may be split into a number of portions equal to the number of processing nodes available in the distributed processing system.

At step 330, in some embodiments, identifiers may be determined and associated with the portions formed at step 320. This step may be performed by a module like ingest module 120 and/or software like analyzer 122 of FIG. 1. The identifiers may be unique. The identifiers may be generated using hashes, sequences, identifiers associated with processing nodes of the distributed processing system, timestamps, and/or other suitable techniques. The identifiers may be used to track the portions of data formed at step 320. The identifiers and their corresponding data portions may be placed into a suitable data structure, such as a key-value pair.

At step 340, in some embodiments, the data portions formed at step 320 may be stored at the processing nodes of the distributed processing system. This step may be performed by one or more modules or software, such as ingest module 120, analyzer 122, and/or cache module 125 of FIG. 1. The data portions may be stored with the identifiers determined at step 330. For example, key-value pairs formed at step 330 may be stored at the processing nodes in this step. The data portions may be stored in a distributed cache system (such as MEMCACHED) implemented by the processing nodes. A module such as cache module 125 may be configured to store and retrieve data in the distributed cache system and may be used at step 340 in order to store the data portions. In some embodiments, the data portions may be stored in the primary storage of the processing nodes of the distributed processing system. This may help to reduce latency issues when processing data at the processing nodes since processors on the processing nodes have direct access to the primary storage as opposed to secondary storage where data must first be loaded into primary storage before processors may access and operate on the data.

At step 350, in some embodiments, modules may be configured to facilitate the processing of the data portions stored at step 340. This step may be performed by a module such as ingest module 120 and/or software like analyzer 122 of FIG. 1. The modules may be configured with: location information of the stored data, algorithms to be applied to the stored data, information regarding where results of processing the stored data should be stored, starting and ending keys specifying which data should be processed, parameters describing how the stored data should be processed, and/or other suitable information that facilitates the retrieval and/or processing of the stored data. The modules may be configured while residing on the processing nodes (e.g., by receiving configuring information over a network) of the distributed processing system or they may be configured and then sent to the processing nodes of the distributed processing system.

At step 360, in some embodiments, the data portions stored at step 340 may be retrieved at each of the processing nodes of the distributed processing system. This step may be performed by a module such as control module 132 of FIG. 1. The data may be retrieved from the primary storage at the processing nodes. The configuration performed at step 350 may provide the information used to retrieve the stored data at step 360. Step 360 may be performed by using the identifiers determined at step 330. For example, the identifiers may have been stored with the data portions at step 340. Modules at the processing nodes may use these identifiers to retrieve the data stored at the primary storage of the processing nodes. As another example, a module at a processing node may be configured with address information regarding where in the processing node's primary storage the data portion is stored. Separate modules or processes at each of the processing nodes may be used to accomplish step 360. For example, at each of the processing nodes a module or process may use an identifier or address information to instruct another module or process to read the data portion out of the primary storage of the processing node.

At step 370, in some embodiments, the processing nodes may generate results by processing the data portions stored at step 340. This step may be accomplished using processing nodes such as processing nodes 130 and analysis module 134 of FIG. 1. Each processing node may apply the same or different processing steps to the data retrieved at step 360 as the other processing nodes based on the configuration performed at step 350. Examples of the processing that may be performed at step 370 include signal processing, statistical processing, grouping, sorting, clustering, searching, correlating data from multiple sensors, transformations, calculations, and/or mappings. The map processing of the MAPREDUCE framework discussed above may be performed at step 370. Some or all of the processing nodes may operate in parallel in performing step 370. For example, if the data portions stored at step 340 include radar pulses, then the processing nodes may perform statistical clustering on the data at step 370.

At step 380, in some embodiments, the results generated at step 370 may be analyzed. This step may be performed by one or more modules in the processing nodes, such as analysis module 134 of FIG. 1. The reduce processing of the MAPREDUCE framework discussed above may be performed at step 370. Sorting, grouping, scoring, comparing, and/or verifying the results generated at step 370 may be performed at step 380. For example, when processing radar signals, scoring clusters generated at step 370 may be performed at step 380. The analysis performed at step 380 may be performed in the same or different process(es) and/or module(s) as those used at step 370.

At step 385, in some embodiments, it may be determined whether further processing of the data needs to be performed. If it is determined that further processing should be performed, the process may return to step 370. If it is determined that further processing does not need to be performed, the process may proceed to step 390. This step may be performed by one or more modules in the processing nodes, such as control module 132 and/or analysis module 134 of FIG. 1. This decision may be based, at least in part the analysis performed at step 380. For example, if scoring was performed at step 380, it may be determined at step 385 whether specified tolerances or thresholds have been met. If they were not met, then it may be determined to further process the data and the procedure may return to step 370. If they were met, then the step 390 may be performed. Other suitable criteria may be used to determine whether to further process the data. For example, counters may be used to determine whether the data has been processed according to a specified number of iterations. In some situations, a combination of counters and thresholds may be used. For example, it may be determined to proceed to step 390 only if a score determined at step 380 is above a particular threshold and if the processing at step 370 has been performed at least three times. The number of iterations of processing to be performed on the data may be determined statically or dynamically. The number of iterations may be determined based on the type of the data, size of the data, characteristics of the processing nodes, and/or the number of processing nodes available.

At step 390, in some embodiments, results generated at the processing nodes may be outputted. This step may be performed by one or more nodes and/or modules, such as output module 138, results node 150, and synthesis module 152 of FIG. 1. The results may be made available to human operators or to other computing nodes. The results from the processing nodes may be transferred to a node such as results node 150 via a network or a more direct connection, such as Universal Serial Bus. In some embodiments, the processing nodes form a distributed cache and the results may be stored at the primary storage of each of the processing nodes. The results may be retrieved using an interface to the distributed cache, such as cache module 125 of FIG. 1.

At step 390, in some embodiments, the results generated by the processing nodes may be further processed. For example, the results from the processing nodes may be combined, sorted, and/or packaged. This may occur at one of the processing nodes or at a separate computing node, such as results node 150 of FIG. 1. Once the results have been processed (if needed), they may be made available by being stored at a network-accessible location or transmitted to another location.

In some embodiments, performing the steps illustrated by FIG. 3 may provide certain advantages. For example, distributed processing may be facilitated by reducing latency penalties associated with storing data at the secondary storage (such as writing to and reading from hard disks) of the processing nodes used in a distributed processing system. As another example, real-time processing of data (such as processing sensor data or streams of data), including large volumes of data, may be improved.

Although the present disclosure has been described with several embodiments, various changes, substitutions, variations, alterations, and modifications may be suggested to one skilled in the art, and it is intended that the present disclosure encompass all such changes, substitutions, variations, alterations, and modifications as fall within the spirit and scope of the appended claims.

What is claimed is:

1. A method comprising:
    receiving, by a processing device, sensor data from a plurality of sensors;
    identifying a first portion of the sensor data and a second portion of the sensor data, the first portion of the sensor data different from the second portion of the sensor data;
    generating a first identifier for the first portion of the sensor data;

generating a second identifier for the second portion of the sensor data;

sending the first portion of the sensor data and the first identifier to a first node, the first node comprising a first primary storage and the first node storing the first portion of the sensor data in the first primary storage, the first primary storage configured in the first node such that a first processor of the first node accesses information stored in the first primary storage without accessing another storage device;

sending the second portion of the sensor data and the second identifier to a second node, the second node comprising a second primary storage and the second node storing the second portion of the sensor data in the second primary storage, the second primary storage different than the first primary storage and configured in the second node such that a second processor of the second node accesses information stored in the second primary storage without accessing another storage device;

configuring a first module on the first node to retrieve the first portion of the sensor data using the first identifier, the first module configured to provide the first portion of the sensor data to a first process operating on the first node, the first process configured to generate a first set of results by processing the first portion of the sensor data; and configuring a second module to retrieve the second portion of the sensor data using the second identifier, the second module configured to provide the second portion of the sensor data to a second process operating on the second node, the second process configured to generate a second set of results by processing the second portion of the sensor data.

2. A method comprising:
receiving, by a processing device, a data set;
identifying a first portion of the data set and a second portion of the data set, the first portion of the data set different from the second portion of the data set;
generating a first identifier for the first portion of the data set;
generating a second identifier for the second portion of the data set;
sending the first portion of the data set and the first identifier to a first node, the first node comprising a first primary storage and the first node storing the first portion of the data set in the first primary storage, the first primary storage configured in the first node such that a first processor of the first node accesses information stored in the first primary storage without accessing another storage device;
sending the second portion of the data set and the second identifier to a second node, the second node comprising a second primary storage and the second node storing the second portion of the data set in the second primary storage, the second primary storage different than the first primary storage and the second primary storage configured in the second node such that a second processor of the second node accesses information stored in the second primary storage without accessing another storage device;
configuring a first module to retrieve the first portion of the data set using the first identifier, the first module configured to provide the first portion of the data set to a first process operating on the first node, the first process configured to generate a first set of results by processing the first portion of the data set; and configuring a second module to retrieve the second portion of the data set using the second identifier, the second module configured to provide the second portion of the data set to a second process operating on the second node, the second process configured to generate a second set of results by processing the second portion of the data set.

3. The method of claim 2, wherein sending the first portion of the data set and the first identifier to the first node comprises sending the first portion of the data set and the first identifier to a distributed cache.

4. The method of claim 2, further comprising:
sending the first module to the first node; and
sending the second module to the second node.

5. The method of claim 2, further comprising:
receiving the first set of results;
receiving the second set of results;
producing output data by correlating the first set of results with the second set of results; and
storing the output data.

6. The method of claim 2 wherein:
generating the first set of results comprises:
generating a first set of intermediate results from the first portion of the data set by performing clustering on the first portion of the data set; and
scoring the first set of intermediate results; and
generating the second set of results comprises:
generating a second set of intermediate results from the second portion of the data set by performing clustering on the second portion of the data set; and
scoring the second set of intermediate results.

7. The method of claim 2, wherein the data set comprises data generated by an array of sensors.

8. The method of claim 2, wherein the first portion of the data set and the second portion of the data set are identified based on the number of nodes in a processing system, the processing system comprising the first node and the second node.

9. A system comprising:
a first node comprising at least one processor configured to:
receive a data set;
identify a first portion of the data set and a second portion of the data set, the first portion of the data set different from the second portion of the data set;
generate a first identifier for the first portion of the data set;
generate a second identifier for the second portion of the data set;
send the first portion of the data set and the first identifier to a second node, the second node comprising a first primary storage and the second node storing the first portion of the data set in the first primary storage, the first primary storage configured in the second node such that a first processor of the second node accesses information stored in the first primary storage without accessing another storage device;
send the second portion of the data set and the second identifier to a third node, the third node comprising a second primary storage and the third node storing the second portion of the data set in the second primary storage, the second primary storage different than the first primary storage and the second primary storage configured in the third node such that a second processor of the third node accesses information stored in the second primary storage without accessing another storage device;

configure a first module to retrieve the first portion of the data set using the first identifier, the first module configured to provide the first portion of the data set to a first process operating on the second node, the first process configured to generate a first set of results by processing the first portion of the data set; and configure a second module to retrieve the second portion of the data set using the second identifier, the second module configured to provide the second portion of the data set to a second process operating on the third node, the second process configured to generate a second set of results by processing the second portion of the data set.

10. The system of claim 9, wherein the at least one processor is configured to send the first portion of the data set and the first identifier to the second node by sending the first portion of the data set and the first identifier to a distributed cache.

11. The system of claim 9, wherein the at least one processor is configured to:
send the first module to the second node; and
send the second module to the third node.

12. The system of claim 9, further comprising a fourth node configured to:
receive the first set of results;
receive the second set of results;
produce output data by correlating the first set of results with the second set of results; and
store the output data.

13. The system of claim 9 wherein:
the first process generates the first set of results by:
generating a first set of intermediate results from the first portion of the data set by performing clustering on the first portion of the data set; and
scoring the first set of intermediate results; and the second process generates the second set of results by:
generating a second set of intermediate results from the second portion of the data set by performing clustering on the second portion of the data set; and
scoring the second set of intermediate results.

14. The system of claim 9, wherein the data set comprises data generated by an array of sensors.

15. The system of claim 9, wherein the at least one processor identifies the first portion of the data set and the second portion of the data set based on the number of nodes in a processing system, the processing system comprising the second node and the third node.

16. A non-transitory computer readable medium having computer readable instructions stored thereon that, when executed by a computer, cause the computer to:
receive a data set;
identify a first portion of the data set and a second portion of the data set, the first portion of the data set different from the second portion of the data set;
generate a first identifier for the first portion of the data set;
generate a second identifier for the second portion of the data set;
send the first portion of the data set and the first identifier to a first node, the first node comprising a first primary storage and the first node storing the first portion of the data set in the first primary storage, the first primary storage configured in the first node such that a first processor of the first node accesses information stored in the first primary storage without accessing another storage device;
send the second portion of the data set and the second identifier to a second node, the second node comprising a second primary storage and the second node storing the second portion of the data set in the second primary storage, the second primary storage different than the first primary storage and the second primary storage configured in the second node such that a second processor of the second node accesses information stored in the second primary storage without accessing another storage device;
configure a first module to retrieve the first portion of the data set using the first identifier, the first module configured to provide the first portion of the data set to a first process operating on the first node, the first process configured to generate a first set of results by processing the first portion of the data set; and
configure a second module to retrieve the second portion of the data set using the second identifier, the second module configured to provide the second portion of the data set to a second process operating on the second node, the second process configured to generate a second set of results by processing the second portion of the data set.

17. The non-transitory computer readable medium of claim 16, wherein the plurality of instructions are operable to send the first portion of the data set and the first identifier to the first node by sending the first portion of the data set and the first identifier to a distributed cache.

18. The non-transitory computer readable medium of claim 16, wherein the instructions are further operable to:
send the first module to the first node; and
send the second module to the second node.

19. The at least one computer readable medium non-transitory computer readable medium of claim 16, wherein the plurality of instructions are further operable to:
receive the first set of results;
receive the second set of results;
produce output data by correlating the first set of results with the second set of results; and
store the output data.

20. The non-transitory computer readable medium of claim 16 wherein the instructions are operable to:
generate the first set of results by:
generating a first set of intermediate results from the first portion of the data set by performing clustering on the first portion of the data set; and
scoring the first set of intermediate results; and
generate the second set of results by:
generating a second set of intermediate results from the second portion of the data set by performing clustering on the second portion of the data set; and
scoring the second set of intermediate results.

21. The non-transitory computer readable medium of claim 16, wherein the data set comprises data generated by an array of sensors.

22. The non-transitory computer readable medium of claim 16, wherein the plurality of instructions are operable to identify the first portion of the data set and the second portion of the data set based on the number of nodes in a processing system, the processing system comprising the first node and the second node.

23. A method comprising:
receiving, by a processing device, a data set;
identifying a first portion of the data set and a second portion of the data set, the first portion of the data set different from the second portion of the data set;
generating a first identifier for the first portion of the data set;
generating a second identifier for the second portion of the data set;

sending the first portion of the data set and the first identifier to a first node, the first node comprising a first primary storage and the first node storing the first portion of the data set in the first primary storage, the first primary storage configured in the first node such that a first processor of the first node accesses information stored in the first primary storage without accessing another storage device; and sending the second portion of the data set and the second identifier to a second node, the second node comprising a second primary storage and the second node storing the second portion of the data set in the second primary storage, the second primary storage different than the first primary storage and the second primary storage configured in the second node such that a second processor of the second node accesses information stored in the second primary storage without accessing another storage device.

24. A system comprising:

a first node comprising at least one processor configured to:

receive a data set;

identify a first portion of the data set and a second portion of the data set, the first portion of the data set different from the second portion of the data set;

generate a first identifier for the first portion of the data set;

generate a second identifier for the second portion of the data set;

send the first portion of the data set and the first identifier to a second node, the second node comprising a first primary storage and the second node storing the first portion of the data set in the first primary storage, the first primary storage configured in the second node such that a first processor of the second node accesses information stored in the first primary storage without accessing another storage device; and send the second portion of the data set and the second identifier to a third node, the third node comprising a second primary storage and the third node storing the second portion of the data set in the second primary storage, the second primary storage different than the first primary storage and the second primary storage configured in the third node such that a second processor of the third node accesses information stored in the second primary storage without accessing another storage device.

25. A non-transitory computer readable medium having computer readable instructions stored thereon that, when executed by a computer, cause the computer to:

receive a data set;

identify a first portion of the data set and a second portion of the data set, the first portion of the data set different from the second portion of the data set;

generate a first identifier for the first portion of the data set;

generate a second identifier for the second portion of the data set;

send the first portion of the data set and the first identifier to a first node, the first node comprising a first primary storage and the first node storing the first portion of the data set in the first primary storage, the first primary storage configured in the first node such that a first processor of the first node accesses information stored in the first primary storage without accessing another storage device; and send the second portion of the data set and the second identifier to a second node, the second node comprising a second primary storage and the second node storing the second portion of the data set in the second primary storage, the second primary storage different than the first primary storage and the second primary storage configured in the second node such that a second processor of the second node accesses information stored in the second primary storage without accessing another storage device.

* * * * *